US009109548B2

(12) United States Patent
Dudar et al.

(10) Patent No.: US 9,109,548 B2
(45) Date of Patent: Aug. 18, 2015

(54) INTERNAL ORIFICE CHARACTERIZATION IN LEAK CHECK MODULE

(71) Applicant: Ford Global Technologies, LLC, Dearborn, MI (US)

(72) Inventors: Aed M. Dudar, Canton, MI (US); Douglas Raymond Martin, Canton, MI (US); Mark W. Peters, Wolverine Lake, MI (US); Robert Roy Jentz, Westland, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 13/891,054

(22) Filed: May 9, 2013

(65) Prior Publication Data

US 2014/0336873 A1 Nov. 13, 2014

(51) Int. Cl.

*G01M 3/04* (2006.01)
*F02M 25/08* (2006.01)
*F02M 33/02* (2006.01)

(52) U.S. Cl.

CPC ................................ *F02M 25/0818* (2013.01)

(58) Field of Classification Search

CPC ...... F02M 33/02; G01M 3/007; G01M 3/004; G01M 3/34
USPC ............... 701/33.9, 32.8, 34.4; 123/518, 520; 73/40.7, 49.3, 49.2
See application file for complete search history.

(56) References Cited

U.S. PATENT DOCUMENTS

| | | | | |
|---|---|---|---|---|
| 4,962,744 | A | 10/1990 | Uranishi et al. | |
| 6,550,318 | B2 * | 4/2003 | Isobe et al. | 73/114.39 |
| 6,964,193 | B2 | 11/2005 | Kobayashi et al. | |
| 7,004,013 | B2 | 2/2006 | Kobayashi et al. | |
| 7,233,845 | B2 | 6/2007 | Veinotte | |
| 7,472,583 | B2 * | 1/2009 | Kato et al. | 73/49.7 |
| 8,245,699 | B2 | 8/2012 | Peters et al. | |
| 8,342,157 | B2 | 1/2013 | Der Manuelian et al. | |
| 2002/0069692 | A1 * | 6/2002 | Cook et al. | 73/49.7 |
| 2005/0044935 | A1 | 3/2005 | Barrera et al. | |

(Continued)

FOREIGN PATENT DOCUMENTS

| | | | |
|---|---|---|---|
| DE | 102011116320 | A1 | 4/2012 |
| JP | H07317612 | A | 12/1995 |

OTHER PUBLICATIONS

Jentz, Robert Roy et al., "Engine-Off Refueling Detection Method," U.S. Appl. No. 13/788,624, filed Mar. 7, 2013, 32 pages.

(Continued)

*Primary Examiner* — Tan Q Nguyen
(74) *Attorney, Agent, or Firm* — James Dottavio; Alleman Hall McCoy Russell & Tuttle LLP

(57) ABSTRACT

Systems and methods for internal orifice characterization in an evaporative leak check module are disclosed. In one example approach, a method comprises operating a pump to draw air from an emission control system through an orifice to obtain a reference pressure, and indicating a leak in response to pressure in the emission control system remaining above a threshold pressure while operating the pump to decrease pressure in the emission control system, where the threshold pressure is based on a coded indication and the reference pressure.

21 Claims, 7 Drawing Sheets

(56) References Cited

U.S. PATENT DOCUMENTS

| | | | | |
|---|---|---|---|---|
| 2009/0266147 | A1* | 10/2009 | Maegawa | 73/40.7 |
| 2011/0265768 | A1 | 11/2011 | Kerns et al. | |
| 2012/0079873 | A1* | 4/2012 | Jackson et al. | 73/49.3 |
| 2012/0097252 | A1* | 4/2012 | McLain et al. | 137/1 |
| 2012/0211087 | A1 | 8/2012 | Dudar et al. | |
| 2012/0215399 | A1* | 8/2012 | Jentz et al. | 701/32.8 |
| 2013/0055701 | A1* | 3/2013 | Yan et al. | 60/287 |

OTHER PUBLICATIONS

Yang, Dennis Seung-Man et al., “Refueling Detection for Diagnostic Monitor,” U.S. Appl. No. 13/875,201, filed May 1, 2013, 31 pages.

Lindlbauer, Michael Paul et al., “Fuel Tank Isolation Valve Control,” U.S. Appl. No. 13/948,668, filed Jul. 23, 2013, 30 pages.

Dudar, Aed M. et al., “Fuel Tank Depressurization Before Refueling a Plug-In Hybrid Vehicle,” U.S. Appl. No. 13/906,187, filed May 30, 2013, 28 pages.

* cited by examiner

INTERNAL ORIFICE CHARACTERIZATION IN LEAK CHECK MODULE

BACKGROUND/SUMMARY

To reduce discharge of fuel vapors into the atmosphere, vehicles may include evaporative emission control systems which include a carbon canister coupled to a fuel tank to adsorb fuel vapors. For example, a carbon canister may adsorb refueling, diurnal and running loss vapors during engine off conditions. Such vehicles may periodically perform leak diagnostics on the emission control system to monitor for leaks so that mitigating actions and vehicle maintenance may be performed. In some approaches, vacuum generated during engine operation may be used to perform leak diagnostics.

In hybrid electric vehicle applications, engine run-time may be limited hence a vacuum pump may be used for leak detection during engine off conditions. For example, hybrid electric vehicles may include an evaporative leak detection pump included in an evaporative leak check module (ELCM) in an emission control system, e.g., in a vent path of a fuel vapor canister, which may be used for generating vacuum in the emission control system for leak diagnostics.

Such leak check modules may include an internal reference orifice which may be used to obtain a reference pressure which is used as a pass/fail threshold for leak testing. For example, during a leak test, the pump in the module may evacuate a small volume of air from the emission control system through the internal orifice to obtain the reference pressure. The reference pressure obtained from the reference orifice may assist in compensating for environmental conditions such as temperature, altitude, fuel level, etc., during the leak test. The pump may then be operated to generate decreasing pressure in the emission control system which may be monitored so that a leak is indicated in response to the pressure in the emission control system remaining above the reference pressure.

However, the inventors herein have recognized that controllers in a vehicle with such leak check modules may assume a default orifice size for internal reference orifices in leak check modules. For example, during leak diagnostics the controller may assume that the internal orifice in a leak check module is of a default size or diameter, e.g., 0.02", and may indicate a leak based on this assumed default size of the orifice. However, diameters of reference orifices in different leak check modules may vary from the default orifice size assumed by the controller. For example, many leak check modules may include reference orifices with diameters less than the default size, e.g., less than 0.02" in size. This may result in false positive identifications of leaks in the system. For example, if the controller assumes that the reference orifice in a leak test module is the default size when the actual reference orifice size in the module is less than the default size, then leak detection based on a reference pressure obtained from the reference orifice will diagnose leaks less than the default size.

The inventors herein have recognized the above-described issues and, in one example approach, a method for a vehicle with an engine comprises operating a pump to draw air from an emission control system through an orifice to obtain a reference pressure, and indicating a leak in response to pressure in the emission control system remaining above a threshold pressure while operating the pump to decrease pressure in the emission control system, where the threshold pressure is based on a coded indication and the reference pressure. For example, the coded indication may indicate a size of the orifice.

In this way, the actual orifice size, e.g., as measured by a manufacturer of a leak check module, may be included in a coded indication, e.g., stored in a smart chip integral to the leak check module, so that the controller can receive an input of this characterized leak size and adjust its own threshold in software stored in its memory to only flag leaks of the default size and above. Such an approach may reduce false positive identifications of leaks during leak diagnostics by taking into account the unique reference orifice size for each individual leak check module.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
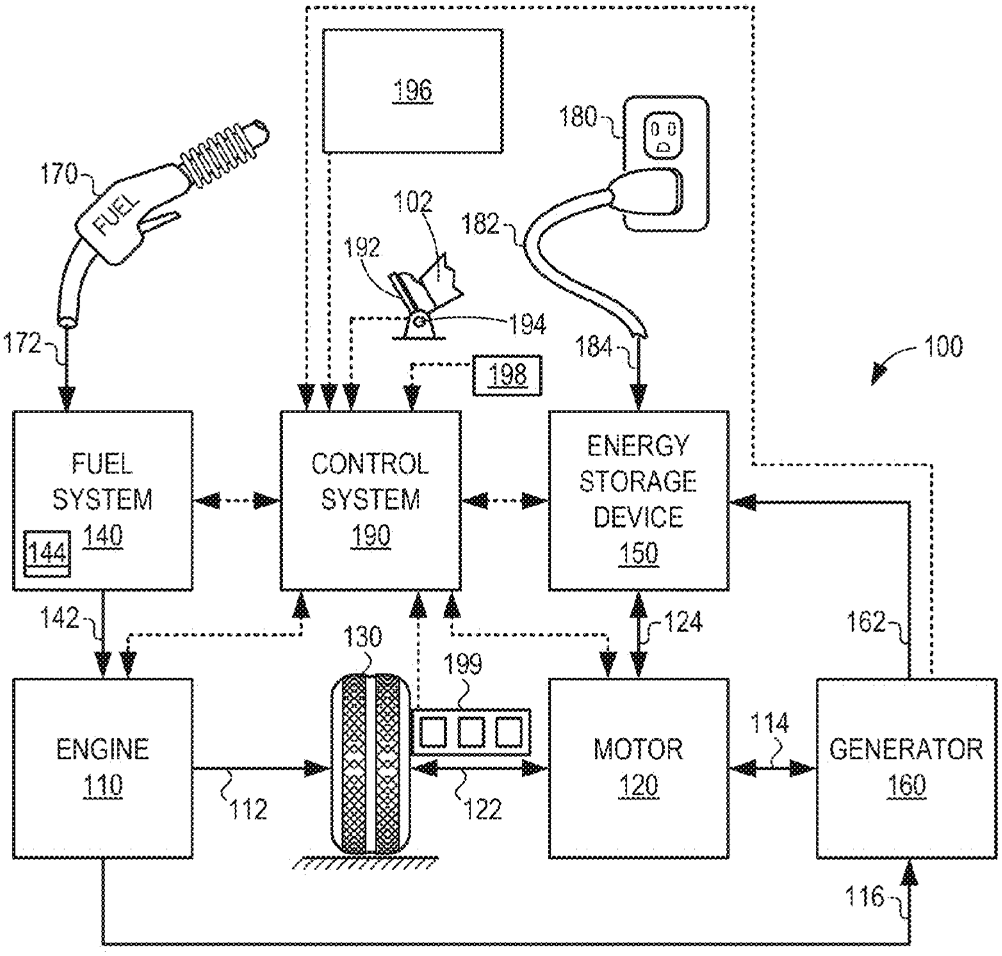
FIG. 1 shows an example vehicle propulsion system.
Figure 2:
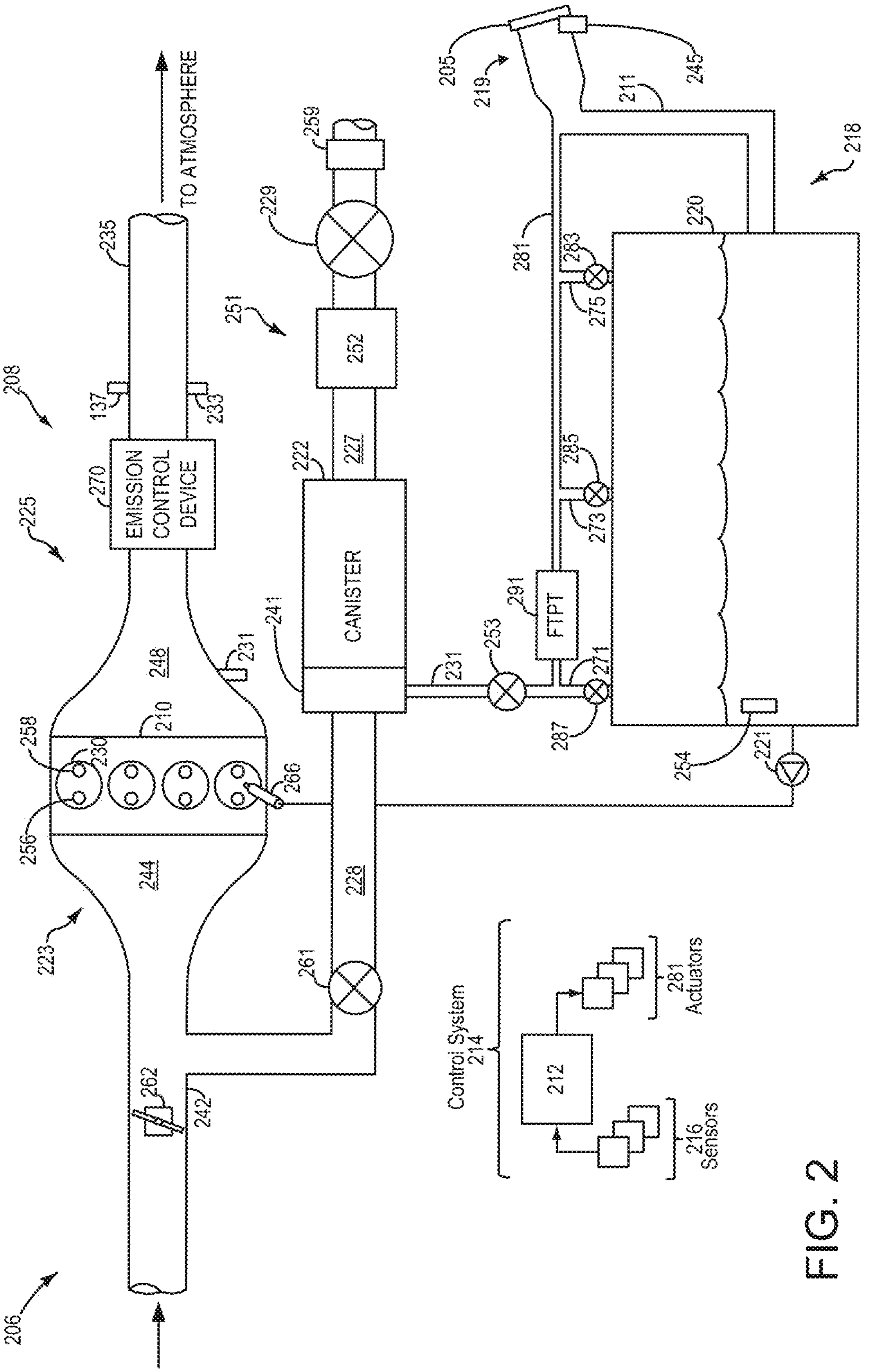
FIG. 2 shows an example vehicle system with an evaporative emission control system.
Figure 3A:
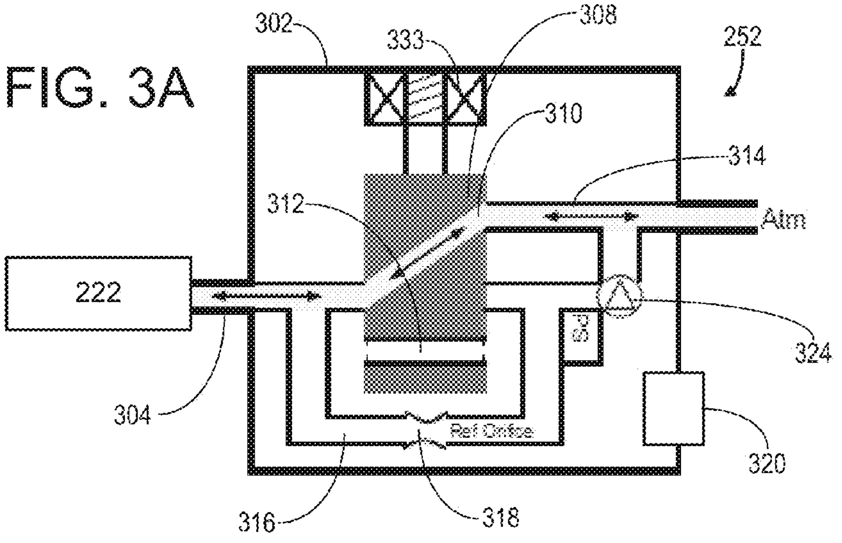
FIGS. 3A-3C show an example evaporative leak check module during different operating conditions.
Figure 3B:
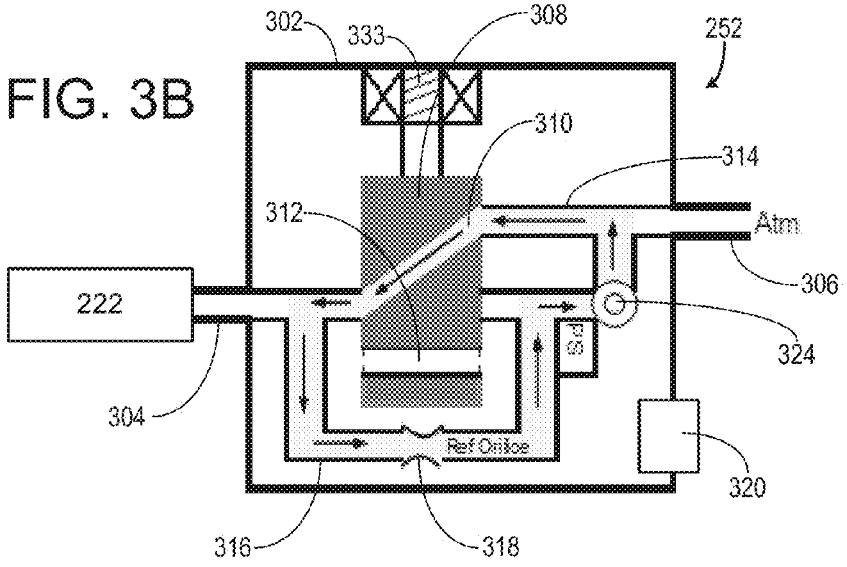
Figure 3C:
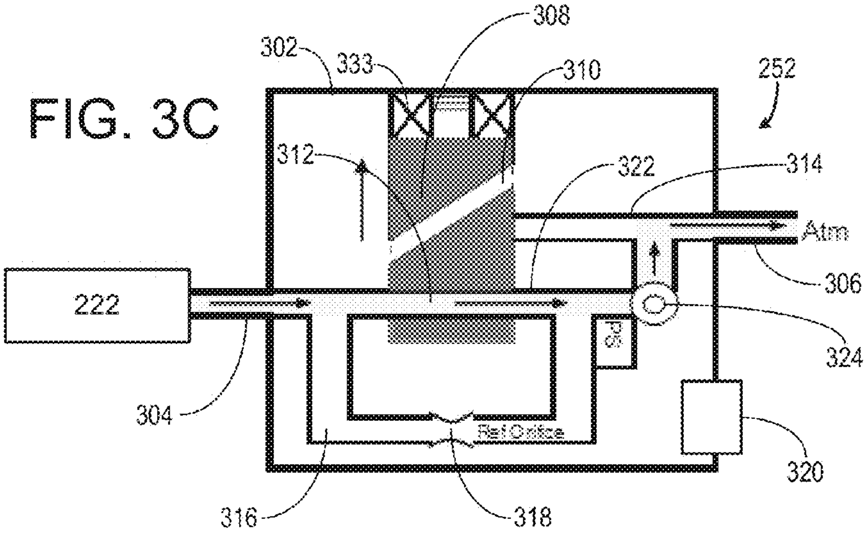

The following description relates to systems and methods for internal orifice characterization in an evaporative leak check module (ELCM) included in a vehicle, e.g., the vehicle system shown in FIG. 1. As shown in FIG. 2, a vehicle system may include an ELCM in an evaporative emission control system, e.g., in a vent path of a fuel vapor canister, for leak testing. As shown in FIGS. 3A-3C, the ELCM may include a pump and a reference orifice used to obtain a reference pressure for indicating presence or absence of leaks in the emission control system. For example, during a leak test, the pump in the module may evacuate a small volume of air from the emission control system through the reference orifice to obtain the reference pressure. The pump may then be operated to generate decreasing pressure in the emission control system which may be monitored by a controller and a leak may be indicated in response to the pressure in the emission control system remaining above the reference pressure.

Figure 4:
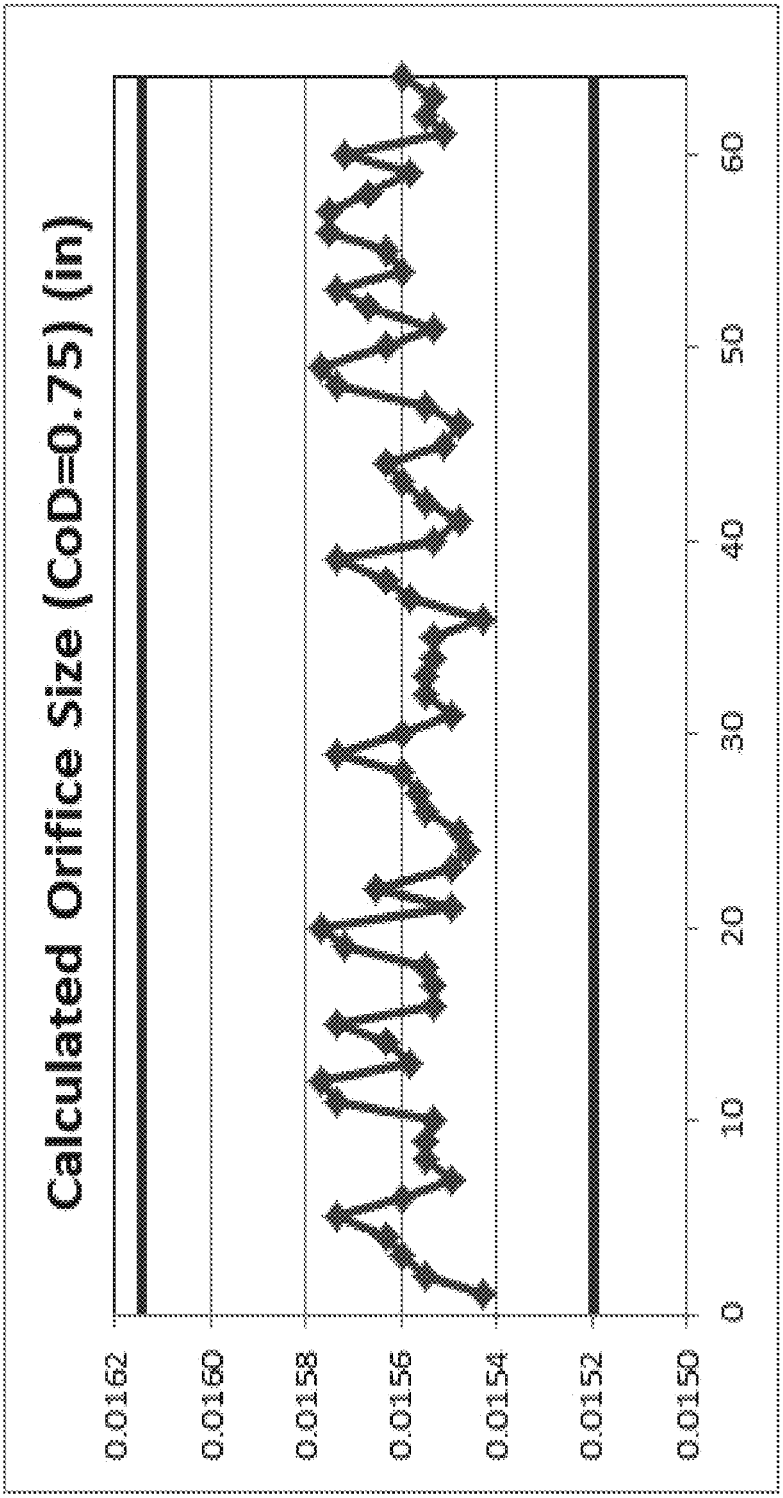
FIG. 4 illustrates variation of orifice size in evaporative leak check modules.
Figure 5:
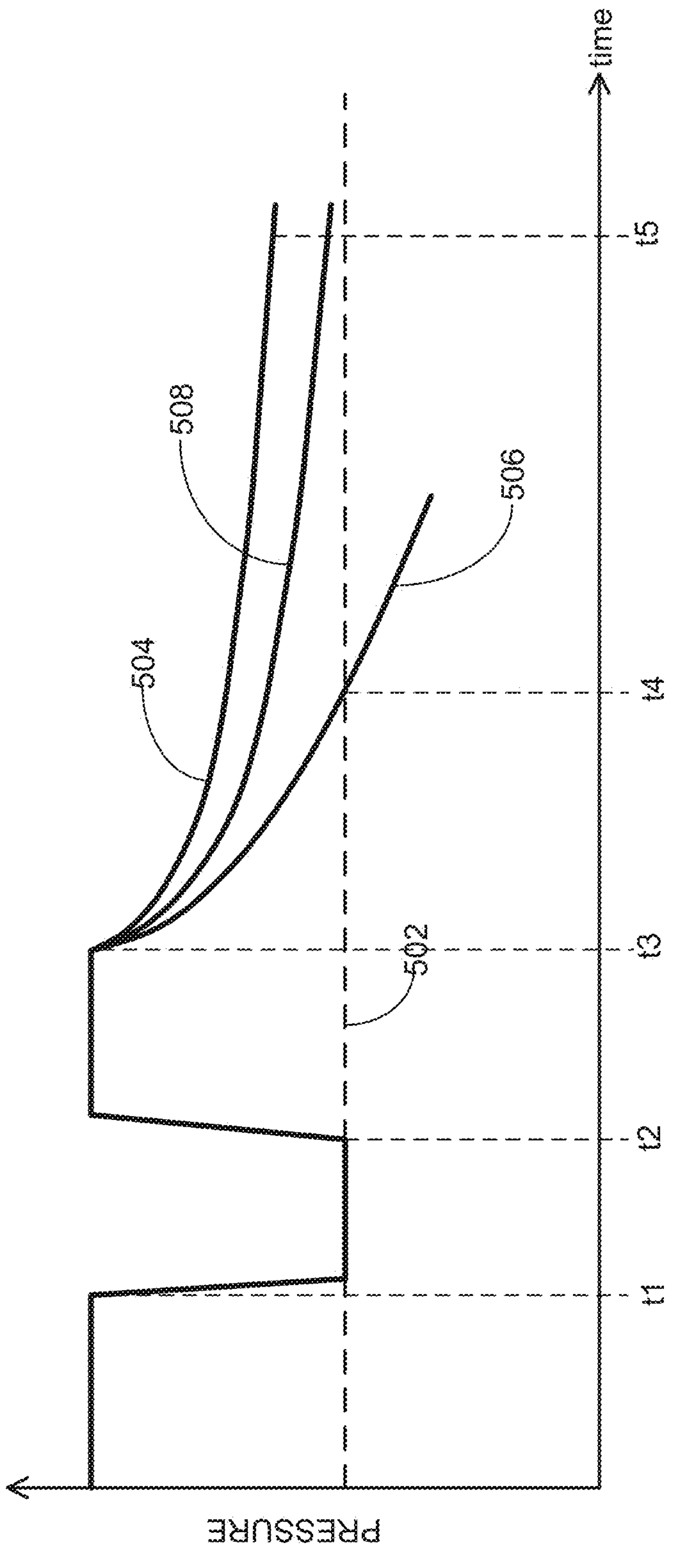
FIG. 5 shows a graph illustrating leak diagnostics performed using an evaporative leak check module.
Figure 6:
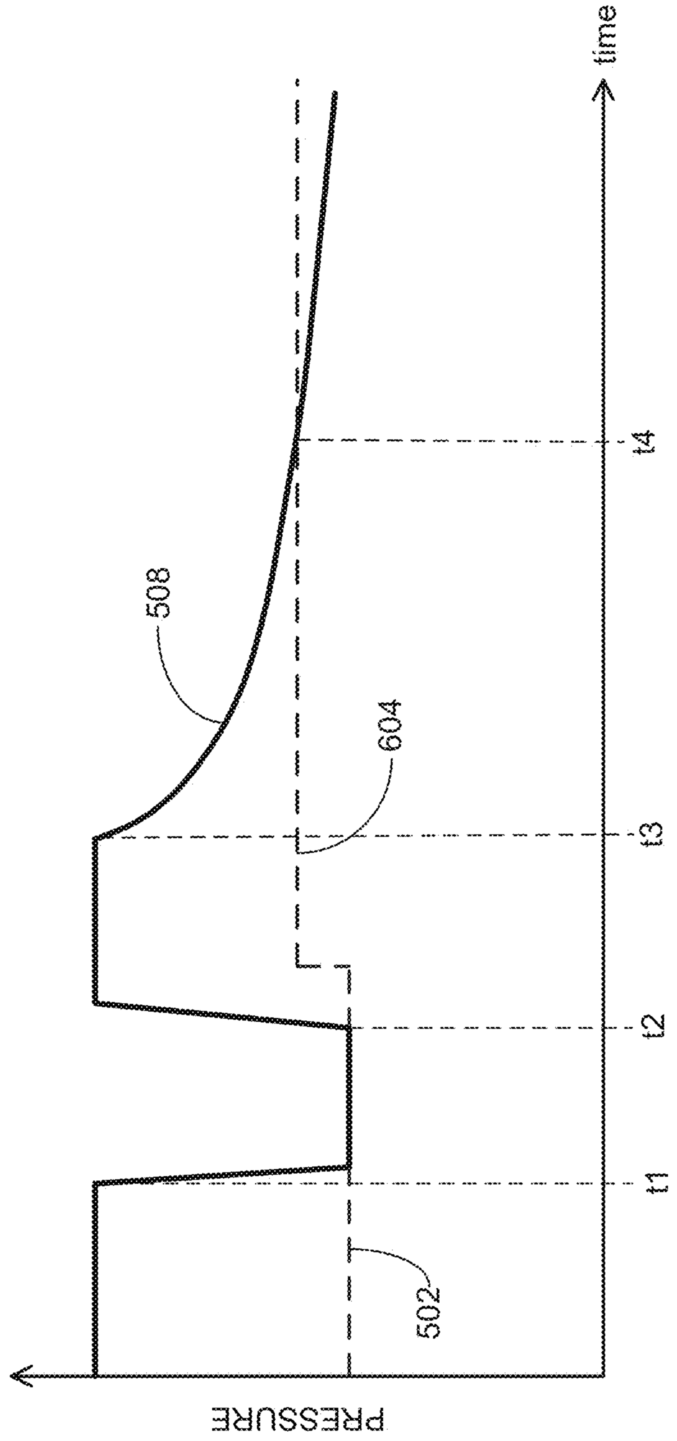
FIG. 6 shows a graph illustrating leak diagnostics performed with an adjusted leak detection threshold using an evaporative leak check module.
Figure 7:
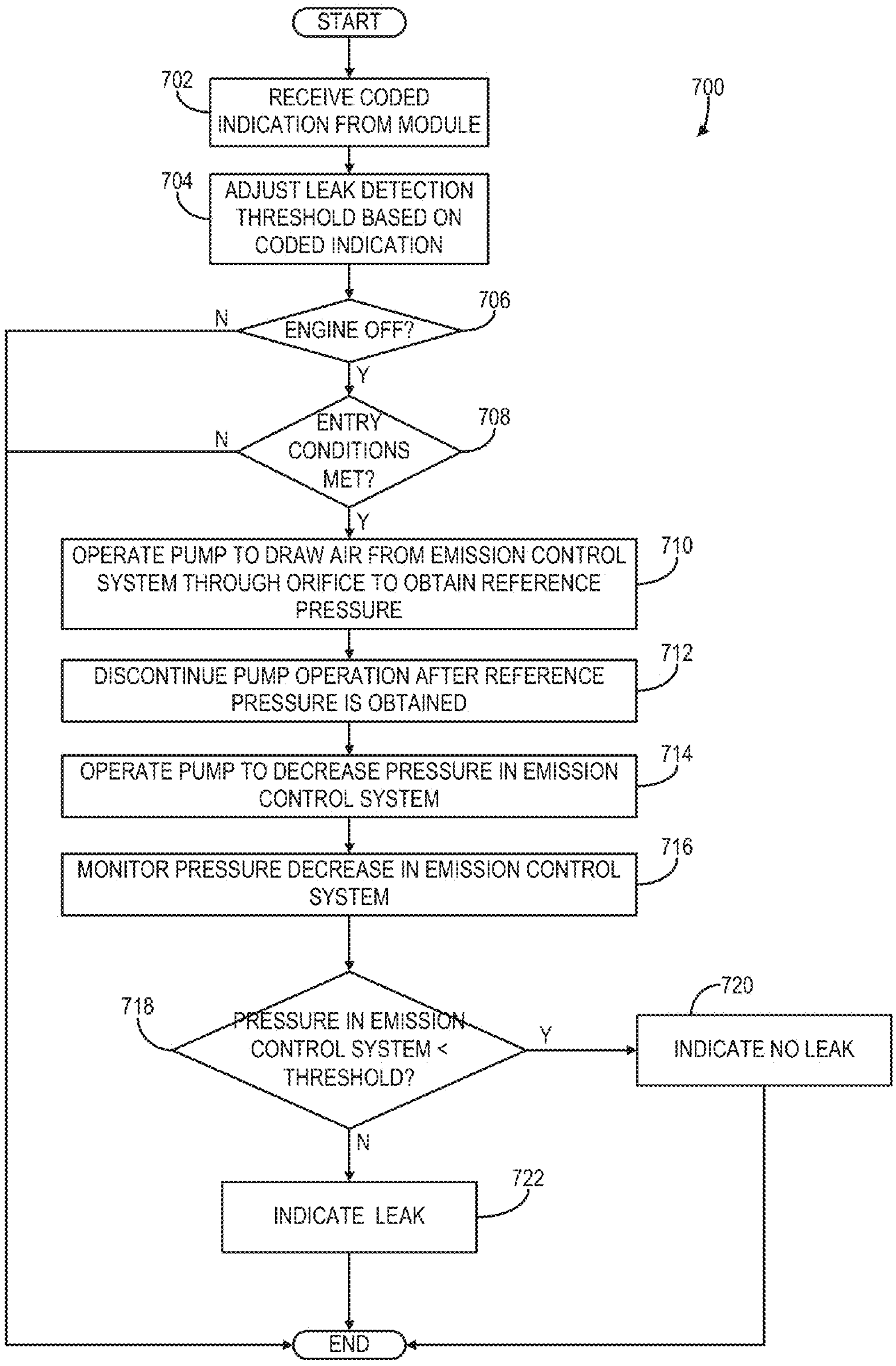
FIG. 7 shows example method for performing leak diagnostics with an adjusted leak detection threshold using an evaporative leak check module.

As illustrated in FIG. 4, the diameter or size of orifices in ELCMs may vary and may be less than a default orifice size assumed by a controller for leak testing. For example, as illustrated in FIG. 5, during leak diagnostics the controller may assume that the internal orifice in a leak check module is of a default size or diameter, e.g., 0.02", and may indicate a leak based on this assumed default size of the orifice. However, a diameter of a reference orifice in an ELCM may be less than the default orifice size assumed by the controller so that leaks less than the default orifice size are indicated by the controller leading to false positive identifications of leaks in the system. As shown in FIGS. 6 and 7, the actual orifice size, e.g., as measured by a manufacturer of a leak check module, may be included in a coded indication, e.g., stored in a smart chip integral to the leak check module, so that the controller can input this characterized leak size and adjust its own threshold in software to only flag leaks of the default size and above. Such an approach may reduce false positive identifications of leaks during leak diagnostics by taking into account the unique reference orifice size for each individual leak check module.

Turning now to the figures, FIG. 1 illustrates an example vehicle propulsion system 100. For example, vehicle system 100 may be a hybrid electric vehicle or a plug-in hybrid electric vehicle. In some examples, vehicle system 100 may be classified according to an emissions ranking, e.g., the vehicle system may be classified as a practically zero emission vehicle (PZEV). Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. Each cylinder may include at least one intake valve 256 and at least one exhaust valve 258 coupled to an intake camshaft and exhaust camshaft, respectively. In some examples, the intake and exhaust valves may be electronically controlled hydraulic valves that direct high pressure engine oil into a camshaft phaser cavity in an arrangement known as variable camshaft timing (VCT). These oil control solenoids may be bolted into the cylinder heads towards the front of the engine near camshaft phasers. A powertrain control module (PCM) may transmit a signal to the solenoids to move a valve spool that regulates the flow of oil to the phaser cavity. The phaser cavity changes the valve timing by rotating the camshaft slightly from its initial orientation, which results in the camshaft timing being advanced or retarded. The PCM adjusts the camshaft timing depending on factors such as engine load and engine speed (RPM). This allows for more optimum engine performance, reduced emissions, and increased fuel efficiency compared to engines with fixed camshafts. VCT may be used on either the intake or exhaust camshaft. In some examples, both the intake and exhaust camshafts may have VCT, an arrangement designated as Ti-VCT.

The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes a fuel vapor canister 222 via vapor recovery line 231, before being purged to the engine intake 223. Fuel vapor canister 222 may include a buffer or load port 241 to which fuel vapor recovery line 231 is coupled. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank isolation valves may be included in recovery line 231 or in conduits 271, 273, or 275. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283, and/or conduit 231 may include an isolation valve 253. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211. A fuel tank pressure transducer (FTPT) 291, or fuel tank pressure sensor, may be included between the fuel tank 220 and fuel vapor canister 222, to provide an estimate of a fuel tank pressure. As another example, one or more fuel tank pressure sensors may be located within fuel tank 220. Further, in some example, a temperature sensor 254 may also be included in fuel tank 220.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

In some examples, flow of air and vapors between canister 222 and the atmosphere may be regulated by a canister vent valve 229. Canister vent valve may be a normally open valve so that fuel tank isolation valve 253 may be used to control venting of fuel tank 220 with the atmosphere. For example, in hybrid vehicle applications, isolation valve 253 may be a normally closed valve so that by opening isolation valve 253, fuel tank 220 may be vented to the atmosphere and by closing isolation valve 253, fuel tank 220 may be sealed from the atmosphere. In some examples, isolation valve 253 may be actuated by a solenoid so that, in response to a current supplied to the solenoid, the valve will open. For example, in hybrid vehicle applications, the fuel tank 220 may be sealed off from the atmosphere in order to contain diurnal vapors inside the tank since the engine run time is not guaranteed. Thus, for example, isolation valve 253 may be a normally closed valve which is opened in response to certain conditions, for example, in response to a fueling event. In some example, in PHEV applications, the fuel vapor canister may only adsorb refueling vapors. In this example, diurnal and running loss vapors may be trapped in the sealed fuel tank by use of a vapor isolation valve FTIV 253.

In some applications, an evaporative leak detection module (ELCM) 252 may be included in emission control system 251, e.g., in a vent path 227 of fuel vapor canister 222, which may be used for generating pressure in the emission control system for leak diagnostics. For example, during engine off conditions, a pump in the module may evacuate a small volume of air from the emission control system through a reference orifice in the module to obtain a reference pressure. The pump may then be operated to generate decreasing pressure in the emission control system which may be monitored by a controller and leaks may be indicated in response to the pressure in the emission control system remaining above an adjusted reference pressure, where the adjusted reference pressure is based on an actual size or diameter of the reference orifice in the ELCM. An example ELCM 252 is described in more detail below with regard to FIGS. 3A-3C.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 237, pressure sensor 291, and temperature sensor 254. Other sensors such as pressure, temperature, air/fuel ratio, and composition sensors may be coupled to various locations in the vehicle system 206. As another example, the actuators may include fuel injector 266, throttle 262, fuel tank isolation valve 253, ELCM 252, and purge valve 261. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 7.

FIGS. 3A-3C show an example evaporative leak check module (ELCM) 252 during different operating conditions. ELCM includes a body 302 with an inlet 304 and an outlet 306. ELCM may be located in a vent path of fuel vapor canister 222, thus inlet 304 may be fluidically coupled to fuel vapor canister 222. Outlet 306 may be in fluidic communication with the atmosphere.

ELCM 252 includes a reference orifice 318 coupled in an orifice conduit 316 where orifice conduit 316 is coupled to inlet 304 and a pump 324 included in ELCM 252. The reference orifice may be used to compensate for environmental conditions such as temperature, altitude, fuel level, etc., during leak testing. For example, pump 324 may be operated for a duration to draw air from the emission control system through orifice 318 in order to obtain a reference pressure for detecting leaks in the emission control system.

ELCM 252 may further include a change over valve 308 which includes a first passage 310 and a second passage 312. Valve 308 may be adjustable from a first position to a second position. In the first position, as shown in FIGS. 3A and 3B, valve 308 fluidically couples inlet 304 with a vented passage 314 via first passage 310. In the second position as shown in FIG. 3C, valve 308 places the inlet 304 in fluidic communication with pump 324 via second passage 312. Change over valve 308 may be actuated by a solenoid 333 so that during a depowered or off state the change over valve 108 is in the first position and during a powered or on state, current may be supplied to the solenoid to adjust valve 308 to the second position.

FIG. 3A shows operating conditions of the ELCM during venting conditions. In this example, the pump 324 is not in operation while the change over valve 308 is depowered so that the inlet 304 is put in fluidic communication with vent passage 314. In this scenario, the ELCM not does consume any power and provides venting of the emission control system through the ELCM to the atmosphere.

FIG. 3B illustrates operation of ELCM 252 to obtain a reference pressure used in leak testing based on drawing a quantity of air from the emission control system through the orifice 318 and measuring a pressure decrease in the emission control system to obtain a reference pressure. In this example, the pump 324 is in operation and the change over valve 308 is in a depowered state so that inlet 304 is in fluidic communication with vent passage 314. In this scenario, the pump is operated to draw air from the emission control system via canister 222 to flow through orifice 318. During operation of the pump, pressure in the emission control system may decrease to a reference pressure value based on the size or diameter of orifice 318.

For example, as illustrated in the graph shown in FIG. 5, which shows pressure in the emission control system versus time, at time t1 a leak test may be initiated. Thus, at time t1 pump 324 is actuated to draw air from the emission control system through the reference orifice 318. As air is drawn from the emission control system through the orifice, the pressure in the emission control system decreases to a reference pressure 502. The reference pressure 502 is based on an actual size of the orifice 318 in the ELCM.

As illustrated in FIG. 4, sizes of orifices in different ELCMs may vary and may be less than a default value assumed by the controller in the vehicle. For example, as shown in FIG. 4, reference orifices for a selected group of ELCMs may have a variability of 0.017"+/−0.003" whereas the controller may assume that all orifices have a default size of 0.02". For example, the ELCM used in the example shown in FIG. 5 may have a reference orifice sized at 0.016". Since the reference pressure 502 is based on the reference orifice sized at 0.016", the reference pressure 502 may be used to detect leaks in the emission control system with a size greater than or equal to 0.016". After the reference pressure is obtained, e.g., after pressure measured in the emission control system stabilizes at the reference pressure, then the pump operation may be discontinued at time t2 so that air no longer flows through the orifice. The reference pressure 502 may then be used as a pass/fail threshold for leak testing as described below.

As shown in FIG. 3C, after the reference pressure is obtained the change over valve 308 may be actuated so that it is adjusted to the second position where the inlet 304 is placed in fluidic communication with pump 324. The pump may then be operated to draw air from the emission control system through the pump and to the atmosphere while bypassing the orifice 318. In this scenario, pressure in the emission control system decreases while the pump is in operation and the pressure in the emission control system may be monitored and compared with the reference pressure to determine if a leak is present. For example, if the pressure in the emission control system remains above the reference pressure then a leak may be indicated and if the pressure in the emission control system falls below the reference pressure then no leak may be indicated.

For example, as shown in FIG. 5, at time t3, after reference pressure 502 is obtained by operating pump 324 for a duration between times t1 and t2, the change over valve 308 may be actuated so that it is adjusted to the second position where the inlet 304 is placed in fluidic communication with pump 324 which is actuated to generate decreasing pressure conditions in the emission control system. The pressure in the emission control system may be monitored while the pump is in operation after time t3 and compared with the reference pressure 502 to determine if a leak is present.

In FIG. 5, three example scenarios are shown for pressure changes in the emission control system after the pump is actuated at time t3. The curve 504 illustrates an example where there is a leak with a size greater than or equal to a default orifice size assumed by the controller for leak testing, e.g., greater than or equal to 0.02". In this example, the pressure in the emission control system remains above the reference pressure 502 indicating that there is a leak with a size greater than or equal to the size of the reference orifice from which the reference pressure was obtained. In this example, the leak size of the leak in the emission control system is greater than or equal to the default orifice size assumed by the control for leak testing, e.g., greater than or equal to 0.02". Thus, in this example, a correct diagnoses of a leak may be indicated in response to the pressure in the emission control system remaining greater than the reference pressure for a predetermined duration, e.g., between times t3 and t5.

The curve 506 illustrates an example where there is no leak present in the emission control system. In this example, the pressure in the emission control system falls below the reference pressure 502 at time t3 indicating that there is no leak with a size greater than or equal to the size of the reference orifice from which the reference pressure was obtained.

The curve 508 illustrates an example where there is not a leak with a size greater than or equal to the default orifice size assumed by the controller for leak testing, e.g., greater than or equal to 0.02". For example, the curve 508 illustrates misdiagnoses of a leak due to a discrepancy between the actual size of the orifice and the default orifice size assumed by the control for leak testing. For example, the default orifice size may be 0.02" whereas the actual orifice size from which the reference pressure 502 was obtained may be 0.016". For example, the curve 508 may correspond to a leak in the emission control system with a size 0.017". Since, in this example, the size of the leak is greater than the 0.016" size of the reference orifice, a leak may be indicated even though the leak size is less than the default orifice size assumed by the controller. In particular, in this example, the pressure in the emission control system remains above the reference pressure 502 indicating that there is a leak with a size greater than or equal to the size of the reference orifice from which the reference pressure was obtained.

In order to accommodate the variation in orifice size so that the reference pressure 502 may be adjusted to reduce misdiagnoses of leaks, the ELCM may include a suitable storage medium 320, e.g., a smart card, integrated with the ELCM or coupled thereto which includes coded information indicating an orifice size specific to that particular ELCM. For example, the reference orifice size may be included as a coded indication in the storage medium by a manufacturer of the ELCM. For example, during a calibration routine performed on ELCM 252, the reference orifice size may be estimated by flowing air at a known pressure across the reference orifice and measuring the flow. This unique reference orifice size may be included in storage medium 320 so that a controller of the vehicle can retrieve the size of the orifice from the ELCM and adjust the leak test pass/fail threshold accordingly so that only leaks at or above the default size, e.g., at or above 0.02", are detected during leak diagnostics.

For example, as shown in FIG. 6, the reference pressure 502 may be adjusted or increased to a new pass/fail threshold value 604 based on the size of the orifice in the ELCM, e.g., as specified in coded indications in storage medium 320. For example, if the estimated orifice size is 0.016" and the reference pressure 502 obtained from the orifice is given by −12 ln H2O, then the new adjusted leak detection threshold 604 may be increased to (0.016/0.02)*−12 ln H2O=−9.6 ln H2O. Thus, reference pressure 502 may be increased to threshold pressure 604 so that only leaks with a size greater than or equal to the default orifice size assumed by the controller are detected. For example, as shown in FIG. 6, the curve 508 which corresponds to a leak with a size of 0.017 is reported as no leak since at time t4, the pressure fails below the adjusted reference threshold 604.

FIG. 7 shows example method 700 for performing leak diagnostics with an adjusted leak detection threshold based on internal orifice characterization in an evaporative leak check module. As remarked above, different leak check modules, e.g., module 252, may have differently sized reference orifices. For each such module, a manufacturer may estimate the actual size of the orifice and encode this information in a storage medium coupled to the module so that, after the module is installed in a vehicle, a controller in the vehicle may input the orifice size of the particular module and adjust leak detection algorithms accordingly.

At 702, method 700 includes receiving a coded indication from an evaporative leak check module. For example, a coded indication indicating a size or diameter of a reference orifice, e.g., orifice 318, may be encoded in storage medium 320, e.g., a smart card or other suitable integrated circuit component, coupled to module 252. This coded indication may be provided by a manufacturer of the module and may be read by a controller in the vehicle to calibrate leak detection algorithms based on the particular size of the orifice in the module.

At 704, method 700 includes adjusting a leak detection threshold based on the coded indication. For example, it may be desirable to detect leaks in the emission control system which are sized greater than or equal to a threshold or default size, e.g., 0.02". The reference orifice in the leak check module 252 is used to obtain a reference pressure for leak testing as described above. This reference pressure is based on the size of the orifice which may be less than the threshold or default size used by the controller to indicate leaks. Thus, the controller may adjust the reference pressure based on a difference between or fraction formed from the threshold size and the orifice size. For example, if the threshold size is 0.02" and if the estimated orifice size is 0.016" and the reference pressure obtained from the orifice is given by −12 In H2O, then the new adjusted leak detection threshold may be increased to (0.016/0.02)*−12 In H2O=−9.6 In H2O. In this way, the reference pressure may be increased to a threshold pressure used by the controller for leak detection in order to reduce false positive leak identifications during leak testing.

At 706, method 700 includes determining if engine off conditions are present. For example, engine off conditions may be present following a vehicle key-off event when the vehicle is turned off or when the vehicle is operated using an auxiliary power source while the engine is not in operation. Engine off conditions may include any vehicle condition in which the engine is not in operation. For example, in hybrid vehicle applications, engine off conditions may occur during vehicle operation while the vehicle is in motion with the engine off. As another example, engine off conditions may occur while the vehicle not in operation and not in motion.

If engine off conditions are present at 706, method 700 proceeds to 708. At 708, method 700 includes determining if entry conditions are met. For example, during engine off conditions a controller may periodically "wake-up" to determine if entry conditions for leak diagnostics are met. In some examples, instructions may be stored in a memory component, e.g., storage medium 320, for sending a signal to a controller in the vehicle to initiate leak testing during an engine off condition. For example, a smart chip coupled to leak check module 252 can act as an "alarm clock" to wake up a vehicle controller after a threshold time duration has passed following a key off event to perform leak detection.

Entry conditions may further be based on leak testing entry conditions. Leak testing in an emission control system and/or a fuel system may be scheduled to be periodically performed during engine off conditions. For example, leak diagnostic routines may be scheduled to be performed after an engine shut-down event in order to determine if leaks are present in components in the emission control system and fuel system. Leak testing entry conditions may be based on an amount of time since a previous leak test greater than a threshold amount of time. Leak test entry conditions may further be based on a temperatures and/or pressure in the emission control system and/or fuel system.

If entry conditions are present at 708, method 700 proceeds to 710. At 710, method 700 includes operating a pump to draw air from the emission control system through the orifice to obtain a reference pressure. For example, pump 324 in leak check module 252 may be actuated while change over valve 308 is depowered in the first position as illustrated in FIG. 3B. The pump is located in a vent path of a fuel vapor canister in the emission control system and draws a quantity of air from the emission control system through the reference orifice 318 to obtain a reference pressure based on the size or diameter of the orifice.

At 712, method 700 includes discontinuing pump operation after the reference pressure is obtained. For example, pump 324 may be operated for a duration to obtain the reference pressure and operation of pump may be discontinued after the duration. The duration of pump operation used to obtain the reference pressure may be based on pressure readings in the emission control system decreasing to and stabilizing at the reference pressure, e.g., as illustrated in FIGS. 5 and 6 between times t1 and t2.

At 714, method 700 includes operating the pump to decrease pressure in the emission control system. For example, as illustrated in FIG. 3C, change over valve 308 may be powered to the second position and pump 324 may be operated to draw air from the emission control system and bypassing the orifice. At 716, method 700 includes monitoring the pressure decrease in the emission control system while the pump is in operation to draw air from the emission control system to decrease pressure in the emission control system. For example, one or more pressure sensors in the emission control system and/or fuel system may be used to monitor pressure changes in the emission control system to determine if a leak is present.

At 718, method 700 includes determining if pressure in the emission control system is less than a threshold pressure. The threshold pressure is based on the coded indication and the reference pressure, where the coded indication may indicate a size or diameter of the orifice. For example, the threshold pressure may be the adjusted reference pressure described above with regard to step 704. The threshold pressure may be greater than the reference pressure obtained in step 710 so that only leaks greater than or equal to a threshold leak size are reported. In this way, the reference pressure may be increased to the threshold pressure used by the controller for leak detection in order to reduce false positive leak identifications during leak testing.

If pressure in the emission control system is less than the threshold at 718, method 700 proceeds to 720 to indicate no leak. For example, in response to pressure in the emission control system decreasing below the threshold pressure while operating the pump to decrease pressure in the emission control system, an indication of no leak may be sent to a controller. For example, in response to an indication of no leak, the diagnostic routine may terminate.

However, if pressure in the emission control system is not less than the threshold at 718, then method 700 proceeds to 722 to indicate a leak. For example, if pressure in the emission control system remains above the threshold pressure for a predetermined duration while operating the pump to decrease pressure in the emission control system, then a leak may be indicated. Indicating a leak may include setting a diagnostic code in a controller in the vehicle so that mitigating actions or maintenance can be performed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:

operating a pump to draw air from an emission control system through an orifice to obtain a reference pressure; and indicating a leak in response to emission control system pressure remaining above a threshold while operating the pump to decrease the emission control system pressure, where the threshold is based on the reference pressure and a coded indication, stored in a storage medium, of a size of the orifice.

2. The method of claim 1, wherein indicating the leak includes setting a diagnostic code stored in memory of a controller and generating a visual indication on a display in the vehicle.

3. The method of claim 1, wherein the pump is operated for a duration to obtain the reference pressure and operation of the pump is discontinued after the duration.

4. The method of claim 1, wherein the threshold is greater than the reference pressure.

5. The method of claim 1, wherein the pump is located in a vent path of a fuel vapor canister in the emission control system.

6. The method of claim 1, further comprising indicating no leak in response to pressure in the emission control system decreasing below the threshold pressure while operating the pump to decrease pressure in the emission control system.

7. The method of claim 1, wherein operating the pump to obtain the reference pressure is performed during an engine off condition.

8. The method of claim 7, wherein the engine off condition follows a vehicle key-off event.

9. The method of claim 1, wherein operating the pump to decrease pressure in the emission control system is performed by operating the pump to draw air from the emission control system and bypassing the orifice.

10. The method of claim 1, wherein the pump is included in an evaporative leak check module, where the evaporative leak check module includes the orifice, and wherein the storage medium which stores the coded indication is integral to the evaporative leak check module.

11. The method of claim 10, wherein operating the pump to obtain the reference pressure is performed in response to a signal received from the evaporative leak check module during engine off conditions.

12. A method for a hybrid vehicle with an evaporative emission control system, comprising:

during an engine off condition:

operating a pump in an evaporative leak check module to draw air from the emission control system through an orifice in the evaporative leak check module to obtain a reference pressure; and indicating a leak in response to pressure in the emission control system remaining above a threshold pressure while operating the pump to decrease pressure in the emission control system, where the threshold pressure is based on the reference pressure and a coded indication, stored in a storage medium, of a size of the orifice, the storage medium integral to the evaporative leak check module.

13. The method of claim 12, wherein the coded indication indicates a diameter of the orifice.

14. The method of claim 12, wherein the pump is operated for a duration to obtain the reference pressure and operation of the pump is discontinued after the duration and wherein operating the pump to decrease pressure in the emission control system is performed by operating the pump to draw air from the emission control system and bypassing the orifice.

15. The method of claim 12, wherein the threshold pressure is greater than the reference pressure.

16. The method of claim 12, wherein the evaporative leak check module is located in a vent path of a fuel vapor canister in the emission control system.

17. The method of claim 12, further comprising indicating no leak in response to pressure in the emission control system decreasing below the threshold pressure while operating the pump to decrease pressure in the emission control system.

18. A system for a hybrid electric vehicle, comprising:

an evaporative emission control system coupled to a fuel system;

an evaporative leak check module coupled to the evaporative emission control system;

a pump in the evaporative leak check module;

an orifice in the evaporative leak check module;

a storage medium integral to the evaporative leak check module, the storage medium including a coded indication;

a controller configured to:

during engine off conditions:

operate the pump to draw air from the emission control system through the orifice to obtain a reference pressure; and indicate a leak in response to pressure in the emission control system remaining above a threshold pressure while operating the pump to decrease pressure in the emission control system, where the threshold pressure is based on the coded indication and the reference pressure.

19. The system of claim 18, wherein the coded information indicates a diameter of the orifice.

20. The system of claim 18, wherein the controller is further configured to indicate no leak in response to pressure in the emission control system decreasing below the threshold pressure while operating the pump to decrease pressure in the emission control system.

21. A method for a vehicle, comprising:

at a controller, receiving a coded indication of an actual size of an orifice of a leak check module, the actual size measured by a manufacturer of the module and encoded in a chip integral to the coupled in a module with the orifice; and at the controller, adjusting leak detection algorithms in response to the coded indication.

* * * * *